United States Patent
Maeda et al.

(10) Patent No.: US 7,973,826 B2
(45) Date of Patent: Jul. 5, 2011

(54) PROGRAM CREATING AND EDITING APPARATUS FOR IMAGE PROCESSING CONTROLLER, AND APPARATUS FOR EDITING IMAGE PROCESSING PROGRAM EXECUTED IN IMAGE PROCESSING CONTROLLER

(75) Inventors: Teruhiko Maeda, Osaka (JP); Toshihiro Konaka, Osaka (JP)

(73) Assignee: Keyence Corporation, Osaka (JP)

( * ) Notice: Subject to any disclaimer, the term of this patent is extended or adjusted under 35 U.S.C. 154(b) by 365 days.

(21) Appl. No.: 12/256,708

(22) Filed: Oct. 23, 2008

(65) Prior Publication Data

US 2009/0128651 A1    May 21, 2009

(30) Foreign Application Priority Data

Nov. 16, 2007 (JP) .................................. 2007-298030

(51) Int. Cl.
- H04N 5/228 (2006.01)
- H04N 7/18 (2006.01)
- H04N 7/00 (2006.01)
- G06K 9/00 (2006.01)
- G06K 9/03 (2006.01)
- G06F 3/16 (2006.01)
- G11B 27/00 (2006.01)

(52) U.S. Cl. ........ 348/222.1; 348/92; 348/119; 348/153; 382/141; 382/309; 715/723; 715/755; 386/278

(58) Field of Classification Search .................. 348/92, 348/119, 153, 222.1; 382/141–147, 255, 382/309; 717/110; 386/278, 281; 715/223, 715/235, 255, 723, 732

See application file for complete search history.

(56) References Cited

U.S. PATENT DOCUMENTS

| 6,535,630 | B1 | 3/2003 | Saeki | |
|---|---|---|---|---|
| 6,549,655 | B1 | 4/2003 | Ikushima et al. | |
| 6,665,441 | B1 | 12/2003 | Nishio | |
| 6,704,441 | B1 | 3/2004 | Inagaki et al. | |
| 6,774,909 | B1 | 8/2004 | Nishio | |
| 6,807,288 | B2 * | 10/2004 | Inagaki | 382/106 |
| 7,215,816 | B2 * | 5/2007 | Ikushima | 382/227 |
| 7,274,812 | B2 | 9/2007 | Saeki | |
| 7,403,218 | B2 * | 7/2008 | Saeki | 348/61 |
| 2009/0153672 | A1 * | 6/2009 | Fujimori et al. | 348/207.1 |

FOREIGN PATENT DOCUMENTS

JP    09-288568    11/1997

OTHER PUBLICATIONS

U.S. Appl. No. 12/256,123, filed Oct. 22, 2008.
U.S. Appl. No. 12/256,772, filed Oct. 23, 2008.

* cited by examiner

Primary Examiner — Lin Ye
Assistant Examiner — Marly Camargo
(74) Attorney, Agent, or Firm — Kilyk & Bowersox, P.L.L.C.

(57) ABSTRACT

There is provided a program creation apparatus with improved operability in checking an operation of a created control program, including: a program generating section for acquiring a camera image from a camera based upon an image pick-up trigger signal, to extract a measurement result from the acquired camera image as a control program for the image processing controller; a simulation part for executing the control program; and a communication section for transferring the control program to the image processing controller, wherein the simulation part includes an offline simulation section for extracting a measurement result from a camera image previously held as a registration image, and an online simulation section for acquiring a camera image from the camera through the image processing controller when executing the control program, to extract the measurement result from the acquired camera image.

4 Claims, 11 Drawing Sheets

F I G. 4
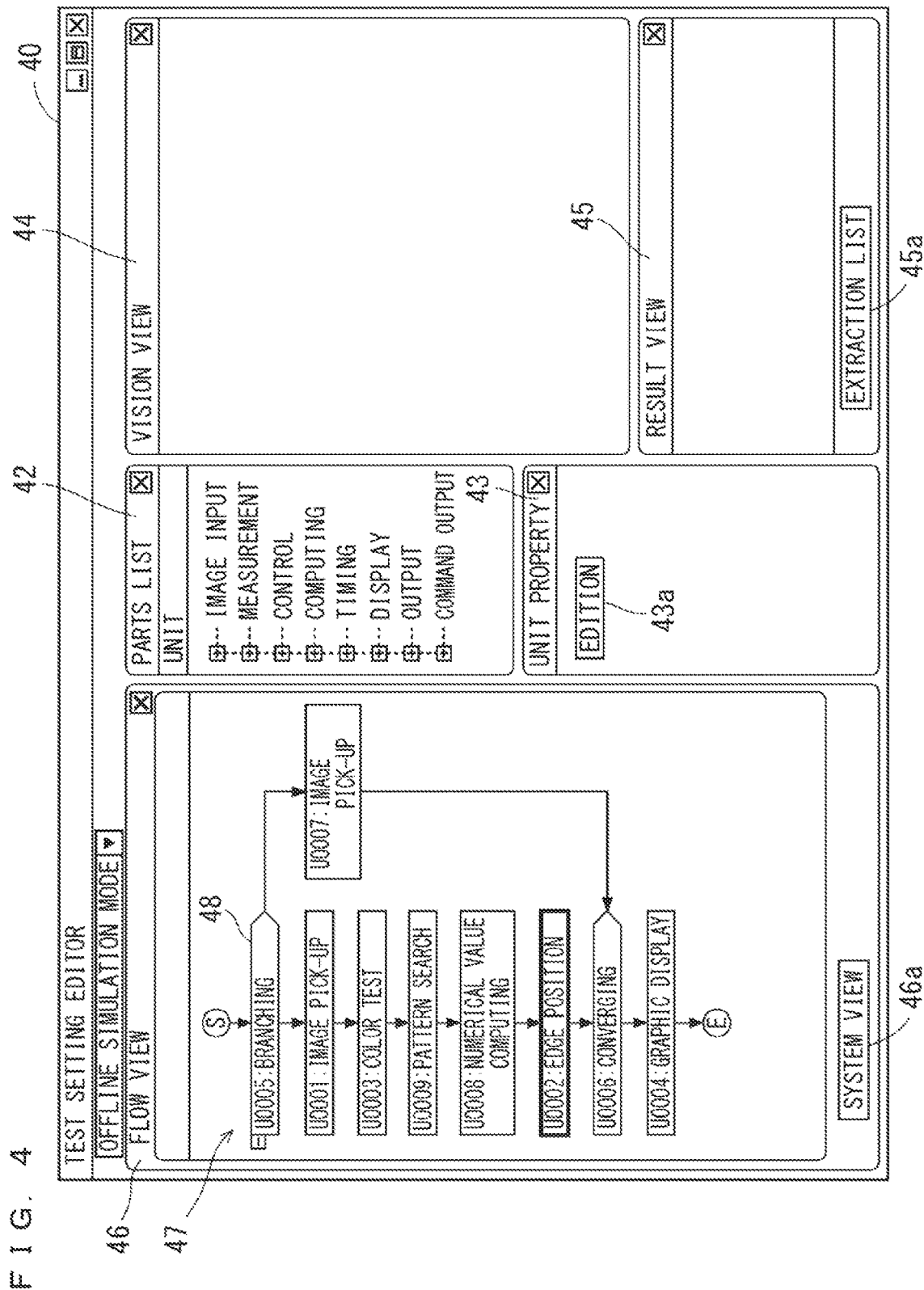

FIG. 7C

| UNIT RESULT | | | | | | | |
|---|---|---|---|---|---|---|---|
| UNIT REFERENCE VARIABLE/RESULT | SYSTEM VARIABLE | LOCAL VARIABLE | GLOBAL VARIABLE | | | | |
| NAME | DEFINITION | HEAD INDEX | NUMBER OF DISPLAYS | CURRENT VALUE | INITIAL VALUE | | |
| ⊞ 1U[0007].RSLT | --- | --- | --- | --- | --- | RESULT |
| &Cam1Img | --- | --- | --- | --- | --- | IMAGE |
| &Cam2Img | --- | --- | --- | --- | --- | IMAGE |
| &Cam3Img | --- | --- | --- | --- | --- | IMAGE |
| &Cam4Img | --- | --- | --- | --- | --- | IMAGE |

PROGRAM CREATING AND EDITING APPARATUS FOR IMAGE PROCESSING CONTROLLER, AND APPARATUS FOR EDITING IMAGE PROCESSING PROGRAM EXECUTED IN IMAGE PROCESSING CONTROLLER

CROSS-REFERENCE TO RELATED APPLICATIONS

The present application claims foreign priority based on Japanese Patent Application No. 2007-298030, filed Nov. 16, 2007, the contents of which is incorporated herein by reference.

BACKGROUND OF THE INVENTION

1. Field of the Invention

The present invention relates to a program creation apparatus for an image processing controller, and more particularly, the present invention relates to an improvement in program creation apparatus which creates a control program for an image processing controller that outputs a determination signal based upon a camera image obtained by photographing an object to be tested.

2. Description of the Related Art

As an image processing controller which performs image processing on a camera image obtained by photographing an object to be tested and outputs as a processing result a determination signal indicating a determination result based upon a shape, a position and a camera image of the object to be tested, or the like, one capable of changing a series of processing procedure is known (e.g. Japanese Unexamined Patent Publication No. H09-288568). Typically a control program for making such an image processing controller execute a series of processing procedure is created using an editor (software) operated on an information processing terminal such as a PC (personal computer). A user can transfer the created control program to the image processing controller, so as to perform a desired test on the object to be tested.

In the conventional program creation apparatus as described above, in a case where a parameter indicating an image pick-up condition or a measurement condition changes, it has been necessary for checking whether or not a control program after the parameter change is operated in a desired manner, to transfer the created control program to the image processing controller and execute the program on the image processing controller. Therefore, since it has been necessary to transfer a control program and execute the program on the image processing controller every time of operational checking of the control program, the conventional program creation apparatus has a problem of poor operability.

Generally, the operational checking of a control program can be performed on a PC by use of software called a simulator that operates on the PC. However, in such a simulator, image processing is simulated using a camera image previously held as a registration image. For this reason, this simulator cannot be employed in such a manner as to capture a camera image from a camera at the time of executing a control program and check its operation, and hence has the problem of being incapable of setting a parameter with high accuracy.

SUMMARY OF THE INVENTION

As described above, there has been a problem with the conventional image processing controller in that, since it has been necessary to transfer a control program and execute the program on the image processing controller every time of operational checking of the control program, the apparatus has poor operability. There has also been a problem in that since image processing is simulated by use of a camera image previously held as a registration image, a parameter cannot be set with high accuracy.

The present invention was made in view of the above circumstances, and has an object to provide a program creation apparatus for an image processing controller with improved operability in checking an operation of a created control program. Specifically, an object is to provide a program creation apparatus capable of performing operational checking of a created control program without transferring the program to the image processing controller. Further, an object is to provide a program creation apparatus capable of acquiring a camera image from a camera at the time of executing a control program, to simulate image processing.

A program creation apparatus for an image processing controller according to a first aspect of the present invention, which creates a control program for the image processing controller used in an image processing apparatus includes a camera which photographs an object to be tested, to generate a camera image, and the image processing controller which acquires a camera image from the camera, extracts a measurement result from the camera image, and determines the quality of the object to be tested based upon this measurement result, to output a determination signal. The program creation apparatus includes: a program generating part for acquiring a camera image from the camera based upon an image pick-up trigger signal, to extract a measurement result from the acquired camera image as a control program for the image processing controller; a simulation part for executing the control program; and a transfer part for transferring the control program to the image processing controller. The program creation apparatus is configured such that the simulation part includes an offline simulation part for extracting the measurement result from a camera image previously held as a registration image, and an online simulation part for acquiring a camera image from the camera through the image processing controller at the time of executing the control program, to extract the measurement result from the acquired camera image.

In this program creation apparatus, a simulation part for executing a control program includes an offline simulation part that uses a camera image previously held as a registration image and an online simulation part for acquiring a camera image from a camera through an image processing controller at the time of executing a control program, to simulate image processing. With such a configuration, since image processing can be simulated on the program creation apparatus, operational checking of a created control program can be performed without transferring the program to the image processing controller. This can lead to an improvement in operability in operational checking of the created control program. Further, since a camera image can be acquired from the camera through the image processing controller at the time of executing the control program so as to simulate image processing, it is possible, through use of a result of such simulation, to set a parameter such as an image pick-up condition or a measurement condition with high accuracy.

A program creation apparatus for an image processing controller according to a second aspect of the present invention includes, in addition to the above configuration: a camera image storing part for holding a series of camera images acquired by the online simulation part when a control program is repeatedly executed; and a camera image exacting part for extracting a camera image to be held as the registration image from the series of camera images. With such a configuration, since a series of camera images obtained at the time of online simulation can be used as registration images for offline simulation, parameters such as an image pick-up condition and a measurement condition can be set with high accuracy.

A program creation apparatus for an image processing controller according to a third aspect of the present invention includes, in addition to the above configuration: a processing unit storing part for holding an image pick-up unit that acquires a camera image from the camera based upon an image pick-up trigger signal, and two or more measurement units that extract a measurement result from the camera image acquired by the image pick-up unit, as processing units showing processing in which a parameter is changeable; a flow chart displaying part for displaying a flowchart generated by arranging the processing units on an execution flow that is started with a start symbol and completed with an end symbol; and an image pick-up condition deciding part for deciding a camera as an object to acquire a camera image from a plurality of cameras, as the parameter of the image pick-up unit selected on the flowchart. The program creation apparatus is configured such that the program generating part generates the control program based upon the flowchart, and a plurality of the image pick-up units can be arranged on the flowchart, and a camera as an object to acquire a camera image can be selected with respect to each of these image pick-up units. With such a configuration, when a control program with a plurality of image pick-up units arranged on the flowchart is online-simulated, a camera image can be obtained as a simulation result with respect to each image pick-up unit acquired from the camera when the control program is active.

The program creation apparatus for an image processing controller according to a fourth aspect of the present invention includes, in addition to the above configuration, a camera image storing part for holding a camera image, acquired by the online simulation part, in association with the image pick-up unit when a control program is repeatedly executed. The program creation apparatus is configured such that in a case where a control program with a plurality of the image pick-up units arranged on the flowchart is executed by the offline simulation part, a camera image to be held as the registration image is automatically extracted from camera images held in the camera image storing part, with respect to each image pick-up unit on the flowchart. With such a configuration, since a camera image obtained at the time of online simulation is automatically extracted as a registration image for offline simulation, the operability in specifying a registration image for offline simulation can be improved.

According to the program creation apparatus for an image processing controller in the present invention, since image processing can be simulated on the program creation apparatus, operational checking of a created control program can be performed without transferring the program to the image processing controller. This can lead to the improvement in operability in operational checking of the created control program. Further, since a camera image can be acquired from the camera through the image processing controller at the time of executing a control program so as to simulate image processing, it is possible, through use of a result of such simulation, to set a parameter such as an image pick-up condition or a measurement condition with high accuracy.

BRIEF DESCRIPTION OF THE DRAWINGS

FIG. 4 is a view showing an example of the operation of the PC 2 in the test support system 100 of FIG. 2, showing the editor screen 40 where a flow view window 46 is displayed;

FIG. 7C is a view showing a part of FIG. 7A, showing an example of a unit result window.

DETAILED DESCRIPTION OF THE PREFERRED EMBODIMENTS

<Test Support System>

Figure 1:
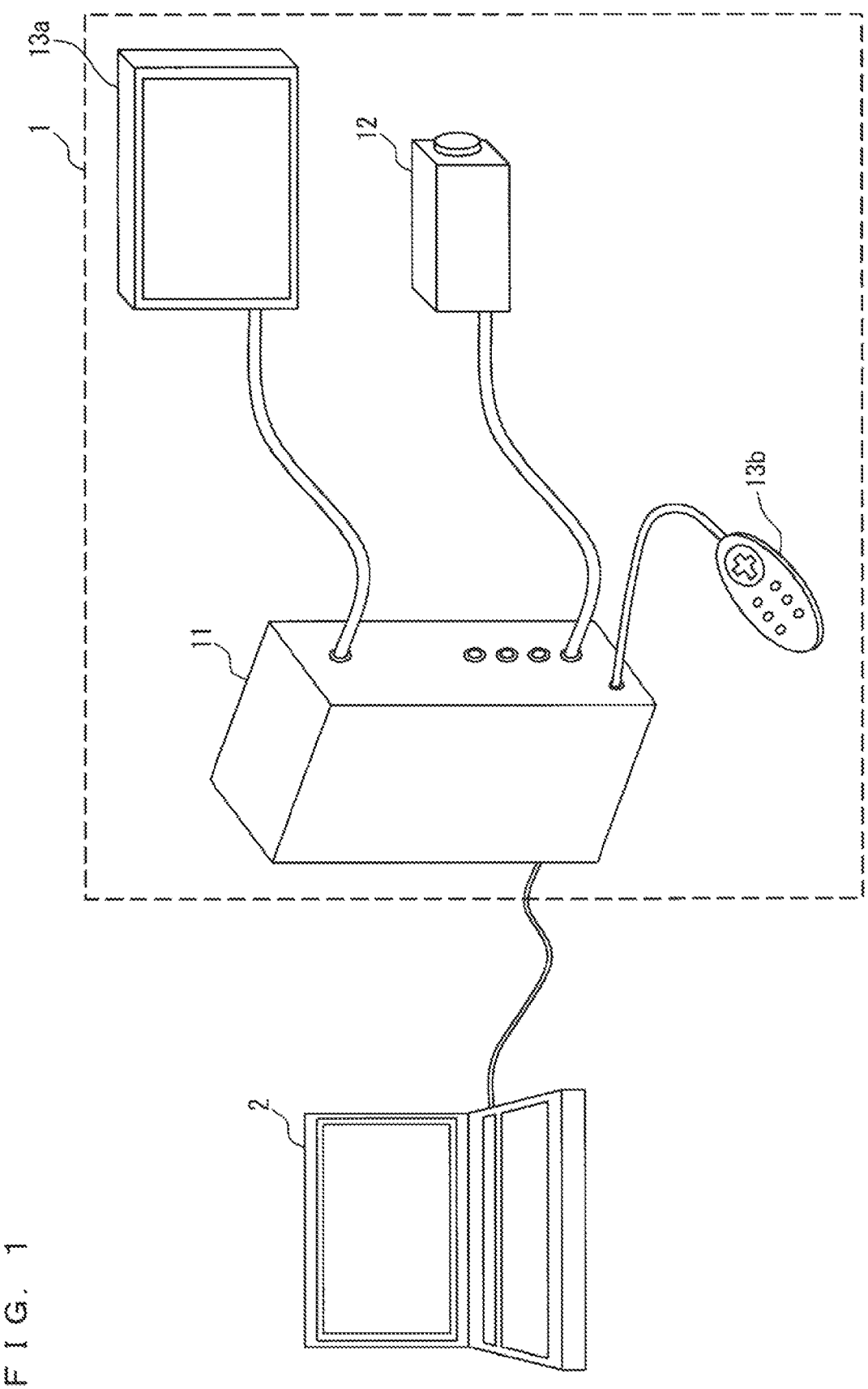
FIG. 1 is a perspective view showing a configurational example of a test support system according to an embodiment of the present invention.

FIG. 1 is a perspective view showing a configurational example of a test support system according to an embodiment of the present invention. This test support system includes an image processing apparatus 1 arranged on a conveyance line for an object to be tested, and a PC (personal computer) 2 which generates a control program for the image processing apparatus 1.

The image processing apparatus 1 includes an image processing controller 11, a camera 12, a display 13a, and an operational unit 13b, and is a sensor apparatus which outputs a determination signal based upon a camera image obtained from an object to be tested. This determination signal is inputted into a not shown PLC (Programmable Logic Controller) or the like and the image processing apparatus 1 is used as a FA (Factory Automation) sensor.

The camera 12 is an image-pickup device which photographs an object to be photographed, generates image data, and outputs the data as a camera image, and is detachably connected to the image processing controller 11. The camera 12 is arranged above the conveyance line along which the object to be tested is conveyed, and the object to be tested is photographed as the object to be photographed.

The display 13a is an output device for displaying a camera image obtained by photographing the object to be tested and an image processing result based upon the camera image. This display 13a is display-controlled by the image processing controller 11, and typically arranged in proximity to the image processing controller 11. That is, the display 13a is a display device for allowing a user to check an operating state of the image processing controller 11 in a case of the image processing controller 11 being in operation. The operational unit 13b is an input device for shifting a focus position and selecting a menu item on the display 13a.

The image processing controller 11 is a body unit of the image processing apparatus 1 which captures a camera image from the camera 12 and outputs, as a processing result a determination signal indicating a determination result based upon the camera image. The operation of acquiring a camera image is, for example, performed based upon an image pickup trigger signal that is a control signal inputted from external equipment such as a PLC and defines timing for capturing a camera image.

This image processing controller 11 is connected with four cameras 12 at the maximum, and based upon camera images obtained from these cameras 12, image processing is performed. A determination signal outputted from the image processing controller 11 is generated as a signal indicating a determination result about the quality of a product, or the like.

Further, this image processing controller 11 is connected with the display 13a and the operational unit 13b, and even not connected with the PC 2, the image processing controller 11 is capable of making the display 13a and the operational unit 13b operate respectively as the output device and the input device.

The PC 2 is a program creation apparatus which creates a control program for the image processing controller 11, and generates a control program by means of an editor (software) operated on the PC 2. At the time of creating the control program for the image processing controller 11, the program can be simulated on the PC 2 for checking its operation.

In the PC 2, layout information for definition of a display mode on the display 13a by the image processing controller 11 is created. This layout information is also created on the edition screen in the PC 2 by means of the editor, and test setting data including the control program and the layout information is generated.

The PC 2 and the image processing controller 11 of the image processing apparatus 1 are connected with each other through a communication network such as Ethernet (registered trademark) or the like. The PC 2 is detachably connected with a plurality of image processing controllers 11. The test setting data created on the PC 2 is transferred to the image processing controller 11 so that the test setting data inside the image processing controller 11 can be rewritten. Further, the test setting data inside the image processing controller 11 can be captured and edited on the PC 2. This PC 2 is typically connected with the image processing controller 11 in maintenance of the image processing apparatus 1.

<System Configuration>

Figure 2:
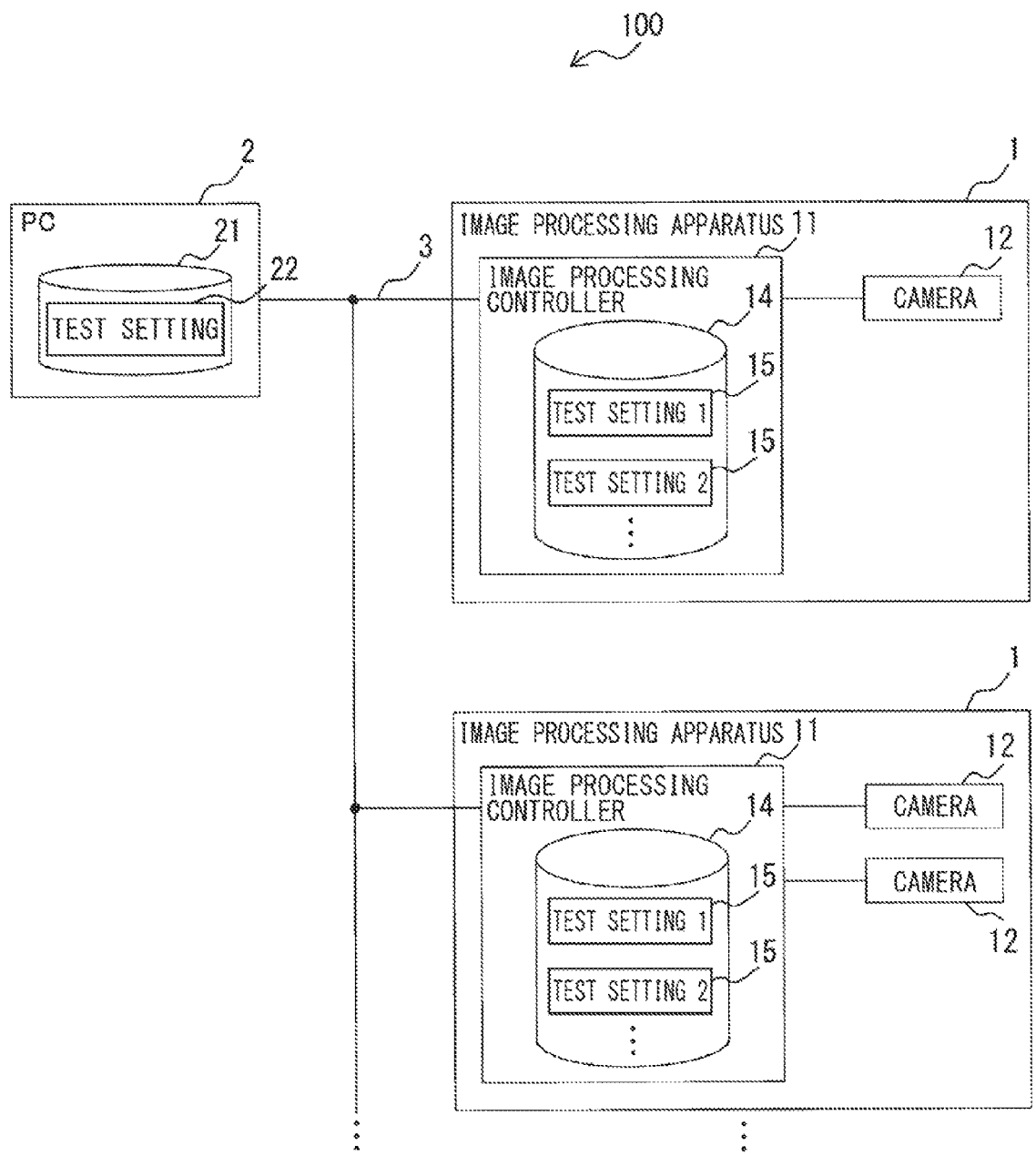
FIG. 2 is a block diagram showing an example of a system configuration of the test support system of FIG. 1.

FIG. 2 is a block diagram showing an example of a system configuration of the test support system of FIG. 1. This test support system 100 is configured by one PC 2 and a plurality of image processing apparatuses 1 connected to the PC 2 through a communication network 3. A control program and layout information created on the PC 2 are stored inside a memory 21 as test setting data 22.

The test setting data 22 created on the PC 2 is transferred to the image processing controller 11 through the communication network 3. At this time, specifying a transfer destination and transferring the test setting data 22 can update test setting data 15 inside a memory 14 or add new test setting data inside the memory 14 in a desired image processing controller 11.

In this image processing controller 11, a plurality of test setting data 15 are held inside the memory 14 such as a flash memory. Each test setting data 15 includes control programs with different processing procedures or test contents, and the test setting data 15 as an object to be executed can be changed based upon a user's operation.

In the PC 2, an operation is performed to obtain the test setting data 15 from the image processing controller 11 connected through the communication network 3, and edit the obtained data.

<Editor Screen>

Figure 3:
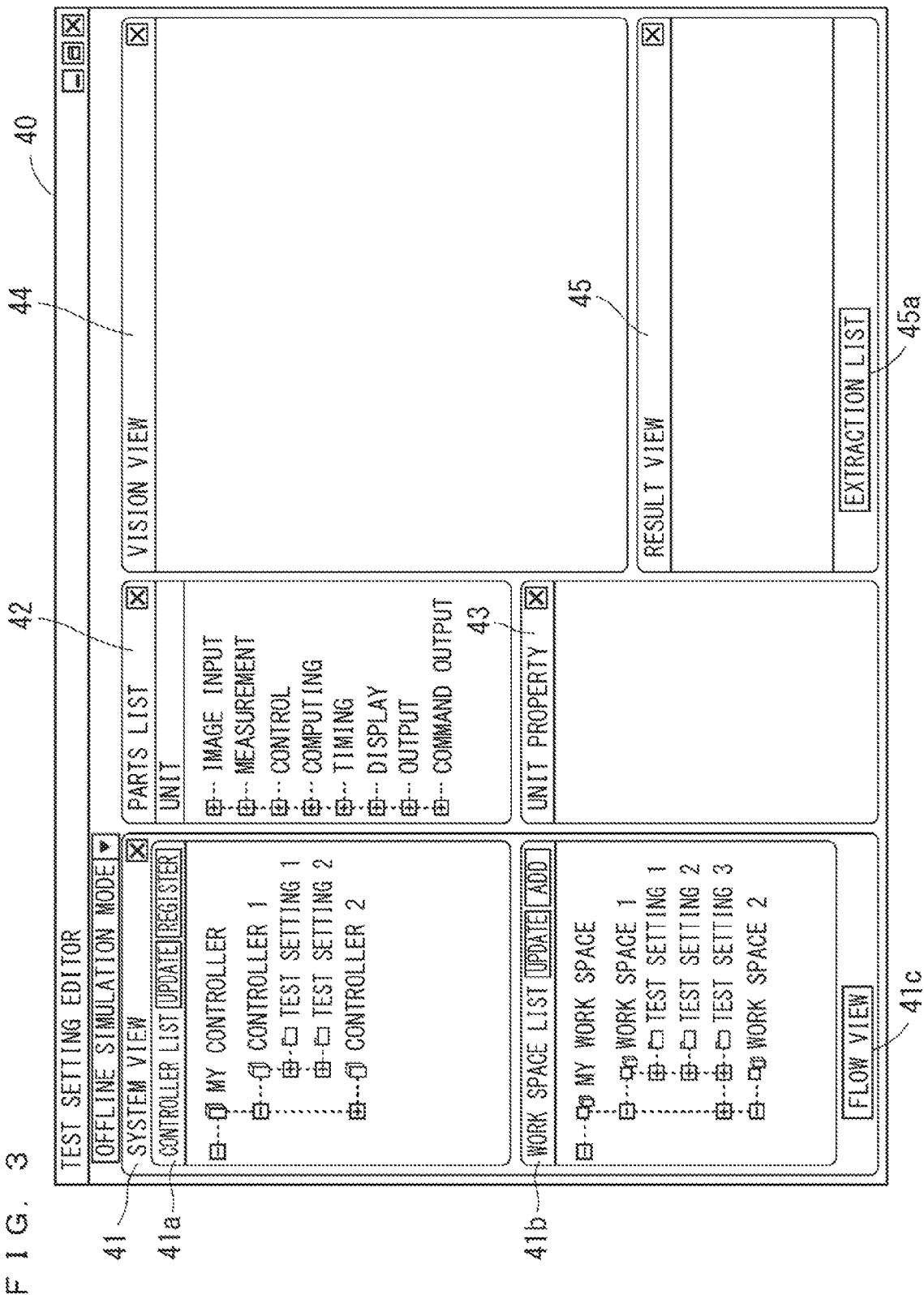
FIG. 3 is a view showing an example of an operation of a PC 2 in a test support system 100 of FIG. 2, showing an editor screen 40 for creating test setting data 22.

FIG. 3 is a view showing an example of an operation of the PC 2 in the test support system 100 of FIG. 2, and shows an editor screen 40 for creating the test setting data 22. The editor screen 40 is an edition screen for newly creating test setting data on the PC 2, or editing test setting data obtained from the image processing controller 11, and the editor screen 40 is displayed on the PC 2.

This editor screen 40 includes a plurality of screens, whose display positions and display ranges are changeable respectively. Specifically, the editor screen 40 includes a system view window 41, a parts-list window 42, a unit property window 43, a vision view window 44, and a result view window 45.

The system view window 41 is a window screen for list-displaying system configurations and test setting data as objects to be edited, and includes a controller list screen 41a and a work space list screen 41b.

The controller list screen 41a is a screen for list-displaying the image processing controllers 11 connected to the PC 2, and displays icons indicating the image processing controllers 11 and icons indicating the test setting data 15 held inside the image processing controllers 11.

The respective icons indicating the image processing controllers 11 and the test setting data 15 are displayed in tree form. Namely, the icons are displayed with the image processing controller 11 taken as an upper hierarchical layer and the test setting data 15 held inside the image processing controller 11 taken as a lower hierarchical layer, such that which image processing controller 11 holds each test setting data 15 is identifiable.

The work space list screen 41b is a screen for list-displaying test setting data as an object to be edited, and displays an icon indicating an operational region on the memory 21 provided in each image processing controller 1, and an icon indicating the test setting data. The operational region on the memory 21 is associated with the corresponding image processing controller 11, and is displayed as a work space. That is, the test setting data is held in each image processing controller 11, and edition is performed in the work space in each image processing controller 11.

The icons respectively indicating operational regions and the test setting data as thus described are displayed in tree form. Namely, the icons are displayed with the work space corresponding to the image processing controller 11 taken as an upper hierarchical layer and the test setting data inside this work space taken as a lower hierarchical layer, such that in which work space each test setting data is present is identifiable.

When an update button (icon) arranged in a heading area of the controller list screen 41a is operated, test setting data is newly obtained from the image processing controller 11, and the test setting data and the system configuration held on the PC 2 are updated to new ones. Further, when a registration button is operated, the test setting data created on the PC 2 is transferred to the image processing controller 11.

When an update button (icon) arranged in a heading area of the work space list screen 41b is operated, test setting data as an object to be edited is updated by test setting data obtained from the image processing controller 11. Further, when an addition button is operated, a new operational region is provided, and an icon indicating test setting data is added.

The parts-list window 42 is a window screen for displaying, as a unit list, processing units selectable at the time of creating test setting data. The processing unit is a symbol showing processing in which a parameter is changeable. As the processing units, provided are an image processing unit showing image processing, an image pick-up unit showing image pick-up processing, a control unit showing flow control processing, an output unit showing output processing, and the like. Arranging such a processing unit on a flowchart inside a later-described flow view window can create a control program including a desired flow sequence.

A plurality of processing units are displayed inside the parts-list window 42. In this example, the processing units are segmented into eight categories depending upon kinds of processing, and icons indicating the respective categories are displayed. Specifically, the processing units are segmented into categories of "image input", "measurement", "control", "computing", "timing", "display", "output", and "command output".

"Image input" is a category to which a processing unit concerning image pick-up belongs, and an image pick-up unit that captures a camera image belongs to this category. The image pick-up unit is a processing unit that acquires a camera image for image processing based upon an image pick-up trigger signal. As the image pick-up trigger signal, an input signal that is inputted from the external equipment such as the PLC through an image pick-up trigger input terminal, and an internal trigger signal that is generated inside the image processing controller 11 can be used. Such an image pick-up unit is associated with parameters for specifying a shutter speed, camera sensitivity, flash delay time, flash-on time, a camera as an object for image pick-up, a flash terminal, and a trigger terminal, as properties.

"Measurement" is a category to which a processing unit concerning measurement belongs, and a measurement unit that extracts a measurement result from a camera image and determines the quality of an object to be tested based upon this measurement result belongs to this category. Examples of such a measurement unit include a pattern search unit, an edge position detection unit, a blob detection unit, and a color test unit.

Pattern search is processing for scanning the inside of a search region on a camera image, to detect a position consistent with a previously registered pattern image. Edge position detection is processing for obtaining an average concentration in a direction vertical to a detection direction in a measurement region on the camera image, to detect a position of an edge from a change in concentration in the detection direction.

Blob detection is processing for binarizing a camera image and extracting a lump of pixels having the same concentration as blobs, to detect the number, an area and a barycentric position of blobs present inside the measurement region. A color test is processing for measuring a color inside a test region, and a numerical value corresponding to the color is extracted as a measurement result.

In the image processing concerning the measurement as thus described, a shape and a size of the object to be tested, a position of the object to be tested inside a camera image, and the like is detected, and the measurement value is outputted as an image processing result. Further, the measurement value is compared with a parameter previously specified by the user, and based upon this comparison result, the quality of the object to be tested, such as presence or absence of deficiency or abnormality, is determined and the determination result is outputted as an image processing result. Further, a camera image, embedded with a symbol graphically indicating a measurement region, a detected position of the object to be tested, and the like, is created and outputted as an image processing result.

"Control" is a category to which a processing unit concerning control belongs, and control units such as a repeat unit, a bypass unit, and an end symbol unit belong to this category. The repeat unit is a processing unit including a repeat start unit that shows a start point for the time of repetition of an execution flow, and a repeat end unit that shows an end point for the same, and the unit shows processing for repeating the execution flow between the start unit and the end unit until a prescribed condition is satisfied.

The bypass unit is a processing unit including a branching unit that branches the execution flow into two or more branch flows and a converging flow that converges the branch flows branched by the branching unit, and the unit shows processing for branching the execution flow under a prescribed condition. The end symbol is a display object for completing one flow sequence.

"Computing" is a category to which a processing unit concerning computing belongs, and image processing units such as a numerical value computing unit and a position correction unit belong to this category. "Timing" is a category to which a processing unit concerning a flow-shift stopping operation belongs, and control units such as a wait unit and an event wait unit belong to this category. The wait unit shows processing for stopping the flow shift just for a prescribed period of time. The event wait unit shows processing for stopping the flow shift until a terminal input or a variable value comes into a prescribed condition.

"Display" is a category to which a processing unit concerning display belongs, and an image processing unit such as a graphic display belongs to this category. The graphic display unit shows processing for referencing another processing unit and graphically displaying a processing result of the referenced processing unit.

"Output" is a category to which a processing unit concerning output belongs, and output units such as a terminal output unit, a result output unit and an image output unit belong to this category. The terminal output unit is associated with parameters for specifying a reference destination unit, a determination result, and an output destination terminal for a determination result, as properties. The result output unit is associated with parameters for specifying a reference destination unit, numerical value data showing a processing result, a data form (text form or binary form) when outputting numerical value data, and an output destination for numerical value data, as properties. The image output unit is associated with parameters for specifying a reference destination unit, a camera image, a data form when outputting image data, and an output destination for image data, as properties.

"Command output" is a category to which a processing unit concerning display belongs, and output units such as a command issue unit, a display pattern switch unit and a dialog display unit belong to this category. The command issue unit shows processing for issuing a command such as registering of an image, switching of a test setting, or resetting.

The unit property window 43 is a window screen for displaying a property of a processing unit selected on the controller list screen 41a, the work space list screen 41b or the flow view window.

The vision view window 44 is a window screen for displaying a camera image associated with the processing unit selected on the controller list screen 41a, the work space list screen 41b or the flow view window.

The result view window 45 is a window screen for displaying a parameter of the processing unit selected on the controller list screen 41a, the work space list screen 41b or the flow view window, and a simulation result.

On this editor screen 40, when a flow view button 41c arranged in a lower portion of the system view window 41 is operated, the flow view window can be displayed in place of the foregoing system view window 41. The flow view window is a window screen that displays as a flowchart a processing procedure to be executed by the image processing controller 11, and displays test setting data selected on the work space list screen 41b.

Further, when an extraction list button 45a arranged in the lower portion of the result view window 45 is operated, an extraction list window can be displayed in place of the result view window 45. The extraction list window is a window screen for extracting a parameter selected on the result view window 45 and a processing result and list-displaying an extraction result per each processing unit.

<Flow View Window>

FIG. 4 is a view showing an example of the operation of the PC 2 in the test support system 100 of FIG. 2, and shows the editor screen 40 where a flow view window 46 is displayed. The flow view window 46 is a window screen that displays a flowchart 47 showing a processing procedure in order to newly create a control program of test setting data or edit a control program obtained from the image processing controller 11.

On the flow view window 46, a flowchart 47 configured by arraying a plurality of processing units 48 is displayed. In the flowchart 47 represented is a processing unit executed in a time-series manner on an execution flow that is started with a start symbol "S" and completed with an end symbol "E". The user can arrange the processing unit 48 on such an execution flow so as to configure a desired control program.

That is, a series of image processing to be performed by the image processing controller 11 is blocked as a processing unit, and the user can only arrange a processing unit on the execution flow inside the flow view window 46 so as to create a flow sequence in which the processing unit performs prescribed processing based upon a processing result of a processing unit immediately before this processing unit.

When a system view button 46a arranged in the lower portion of the flow view window 46 is operated, the system view window 41 can be displayed in place of the flow view window 46.

The processing unit being selected on the flow view window 46 is focus-displayed, and its property is displayed inside the unit property window 43. An edition button 43a is arranged inside the unit property window 43, and when the edition button 43a is operated, a property edition screen for editing a property of a processing unit is displayed. The property edition screen is an edition screen for specifying a parameter of a processing unit based upon a user operation or changing an already specified parameter.

<Flowchart>

Figure 5:
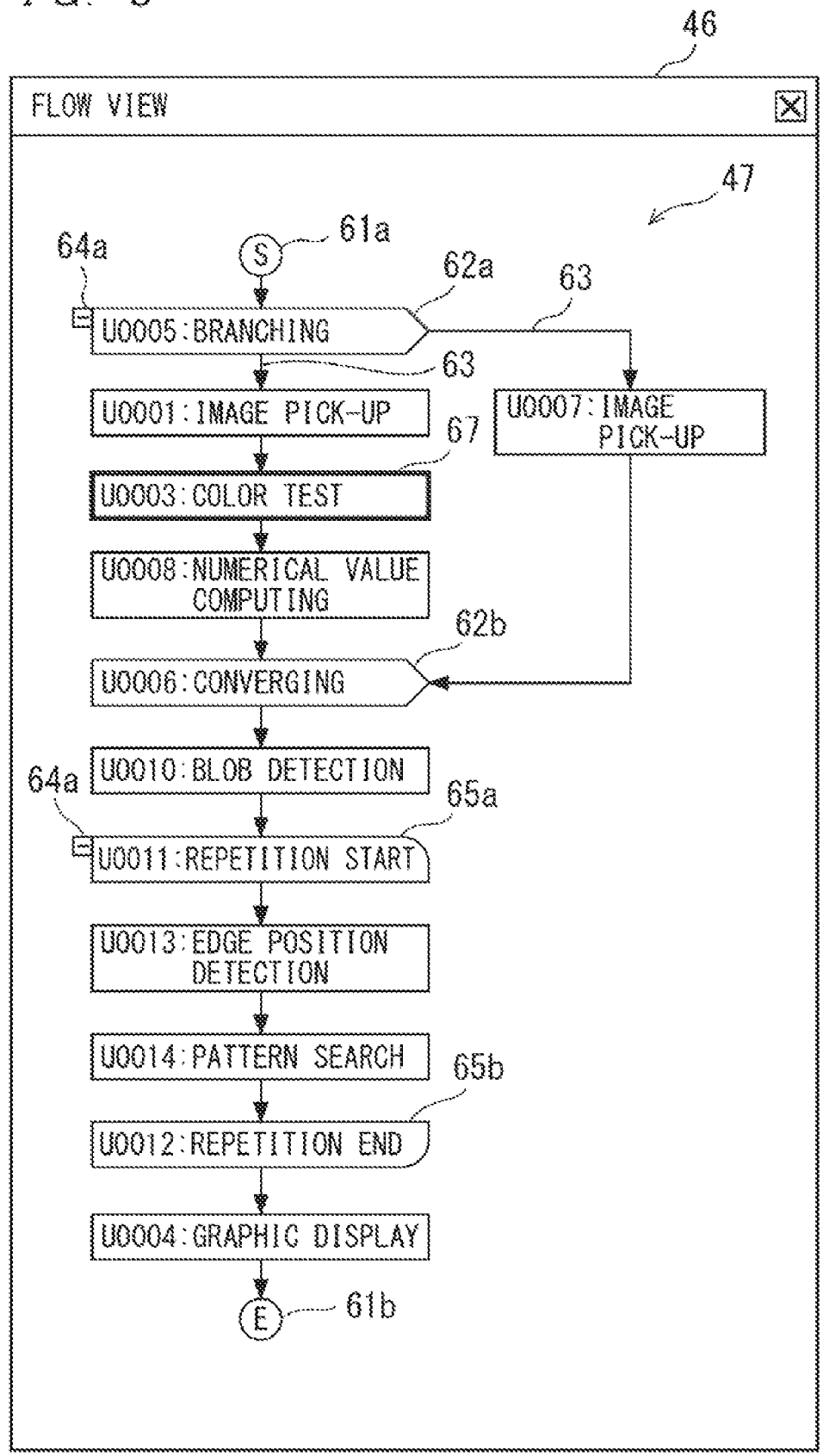
FIG. 5 is a view showing an example of the operation of the PC 2 in the test support system 100 of FIG. 2, showing an editor screen 40 at the time of editing layout information.

FIG. 5 is a view showing an example of the operation of the PC 2 in the test support system 100 of FIG. 2, and shows an example of a flowchart 47 inside the flow view window 46. In this flowchart 47, a plurality of processing units are arranged on an execution flow that is started with a start symbol 61a and completed with an end symbol 61b.

In a case of creating and editing the flowchart 47 on the flow view window 46, an operation is performed using the parts-list window 42. For example, in a case of inserting a processing unit into the flowchart 47, a desired processing unit is selected on the parts-list window 42, and a position for the selected unit on the execution flow is specified by a mouse pointer or the like, so that the processing unit is inserted.

In this example, the flowchart 47 is configured by arranging a branching unit 62a, an image pick-up unit, a color test unit, a numerical value computing unit, a converging unit 62b, a blob detection unit, a repeat start unit 65a, an edge position detection unit, a pattern search unit, a repeat end unit 65b, and a graphic display unit, in this order, on the execution flow.

The branching unit 62a and the converging unit 62b are control units constituting a bypass unit, and when the bypass unit is inserted onto the execution flow, the branching unit 62a and the converging unit 62b are always inserted in pair. In the branching unit 62a, processing is performed for alternatively selecting a branch flow after the branching based upon a measurement result and a determination result of a processing unit immediately before the branching unit 62a. A condition of which branch flow after the branching is to be selected is specified by the user as a parameter of the branching unit 62a.

In this example, the execution flow from the start symbol 61a is branched by the branching unit 62a into two branch flows 63, and the branch flows branched in this branching unit 62a is converged in the converging unit 62b. At that time, the one branch flow 63 reaches the converging unit 62b through the image pick-up unit, the color test unit and the numerical value computing unit, whereas the other branch flow 63 is a bypass channel (diversion) that reaches the converging unit 62b through the image pick-up unit.

The repeat start unit 65a and the repeat end unit 65b are control units constituting a repeat unit, and when the repeat unit is inserted onto the execution flow, the repeat start unit 65a and the repeat end unit 65b are inserted in a pair.

In this example, the edge-position detection unit and the pattern search unit are arranged between the repeat start unit 65a and the repeat end unit 65b, and at the time of execution, the processing of the edge-position detection unit and the pattern search unit are repeated.

A folding icon 64a is arranged on the branching unit 62a and a repeat start unit 65a inside the flowchart 47. This folding icon 64a is an icon for displaying the flowchart 47 with the execution flow between the control units omitted, and is displayed adjacently to the processing unit.

Further, a processing unit selected on the flowchart 47 is focus-displayed, and can make a property of the processing unit displayed inside the unit property window 43, or change a property of the processing unit as an object to be edited.

In the present embodiment, as thus described, the branching unit 62a is arranged on the execution flow inside the flowchart 47. Further in a case where respective image pick-up units are arranged on two different branch flows 63, an image pick-up condition for a camera image with respect to each branch flow can be edited for each of these image pick-up units.

<Property Edition Screen of Image Pick-Up Unit>

Figure 6:
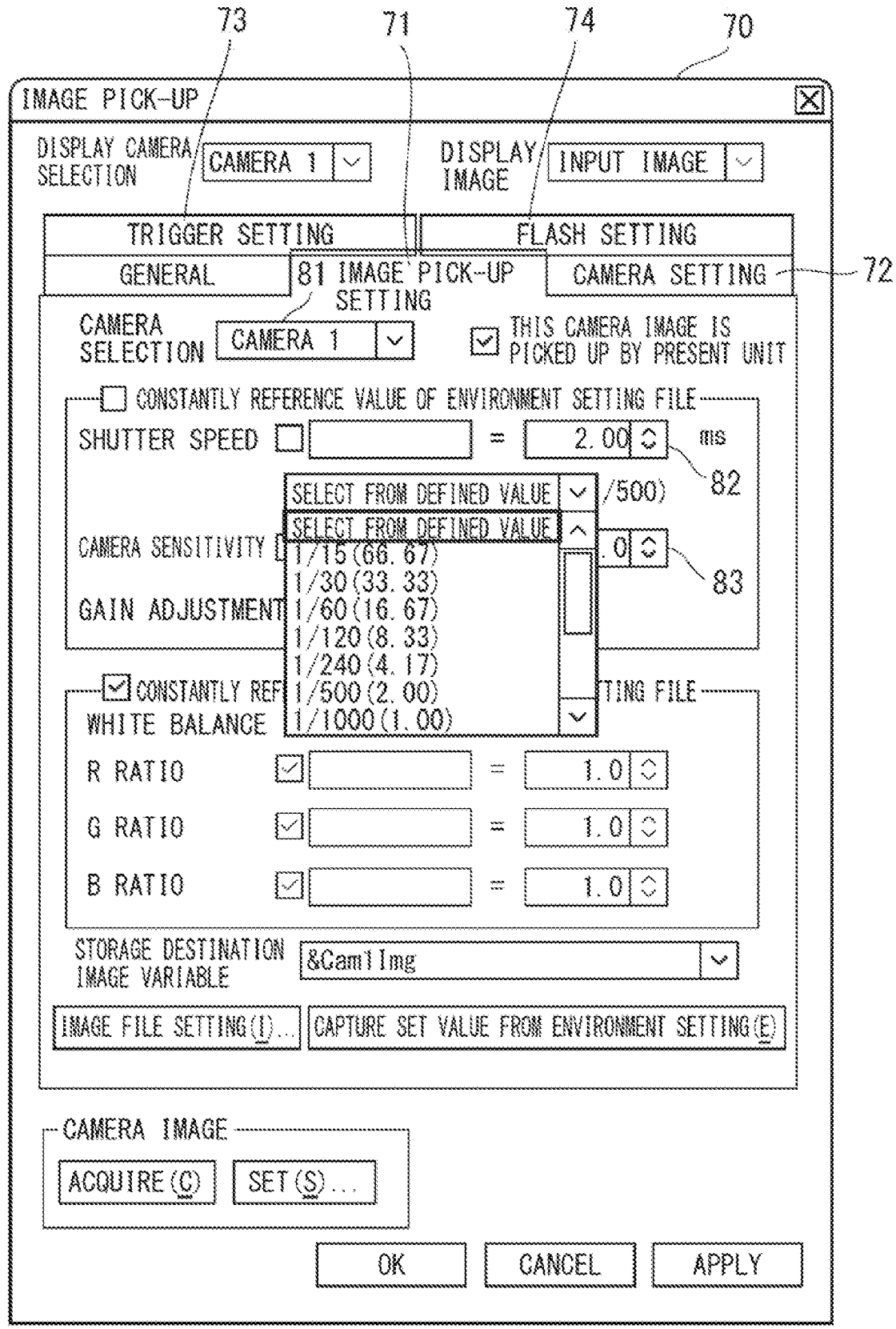
FIG. 6 is a view showing an example of the operation of the PC 2 in the test support system 100 of FIG. 2, showing an example of a property edition screen 70 of an image pick-up unit.

FIG. 6 is a view showing an example of the operation of the PC 2 in the test support system 100 of FIG. 2, and shows an example of a property edition screen 70 for editing a property of an image pick-up unit. The property edition screen 70 is an input screen for a parameter concerning image pick-up of a camera image, and is displayed on the editor screen 40 by operation of the edition button 43a inside the unit property window 43.

On the property edition screen 70, a variety of parameters concerning image pick-up can be selected or specified. In this property edition screen 70, items of image pick-up setting 71, camera setting 72, trigger setting 73, flash setting 74, and the like are provided as editable properties.

Here, the item of the image pick-up setting 71 is selected, and a camera select field 81, a shutter speed input field 82, a camera sensitivity input field 83, and a gain adjustment select field are arranged. The camera select field 81 is an input field for selecting the camera 12 as an object for image pick-up, and any of "camera 1" to "camera 4" can be specified.

The shutter speed input field 82 is an input field for inputting a shutter speed of the camera 12, and is capable of directly specifying a numerical value or selecting a value from a plurality of rated values. The camera sensitivity input field 83 is an input field for inputting a sensitivity level of the camera 12. The gain adjustment select field is an input field for selecting whether or not to perform gain adjustment on image data acquired from the camera 12.

In the trigger setting 73, setting can be made concerning an acquirement condition and an image pick-up trigger in acquiring a camera image for image processing. As the acquirement condition, either a trigger synchronous mode or a trigger asynchronous mode can be selected. The trigger synchronous mode is an image pick-up mode for capturing a camera image photographed in sync with an image pick-up trigger signal. On the other hand, the trigger asynchronous mode is an image pick-up mode for extracting a camera image for image processing based upon an image pick-up trigger signal from a camera image obtained by repeated photographing.

Further, in the setting concerning an image pick-up trigger, an image pick-up trigger for use in acquiring a camera image can be selected. For example, an input terminal or a communication interface as the image pick-up trigger, or an internal trigger, can be selected with respect to each of "camera 1" to "camera 4".

In such a manner, it is possible to perform the setting concerning image pick-up of a camera image with respect to each image pick-up unit selected on the flowchart 47.

<Work Space Setting Screen>

Figure 7A:
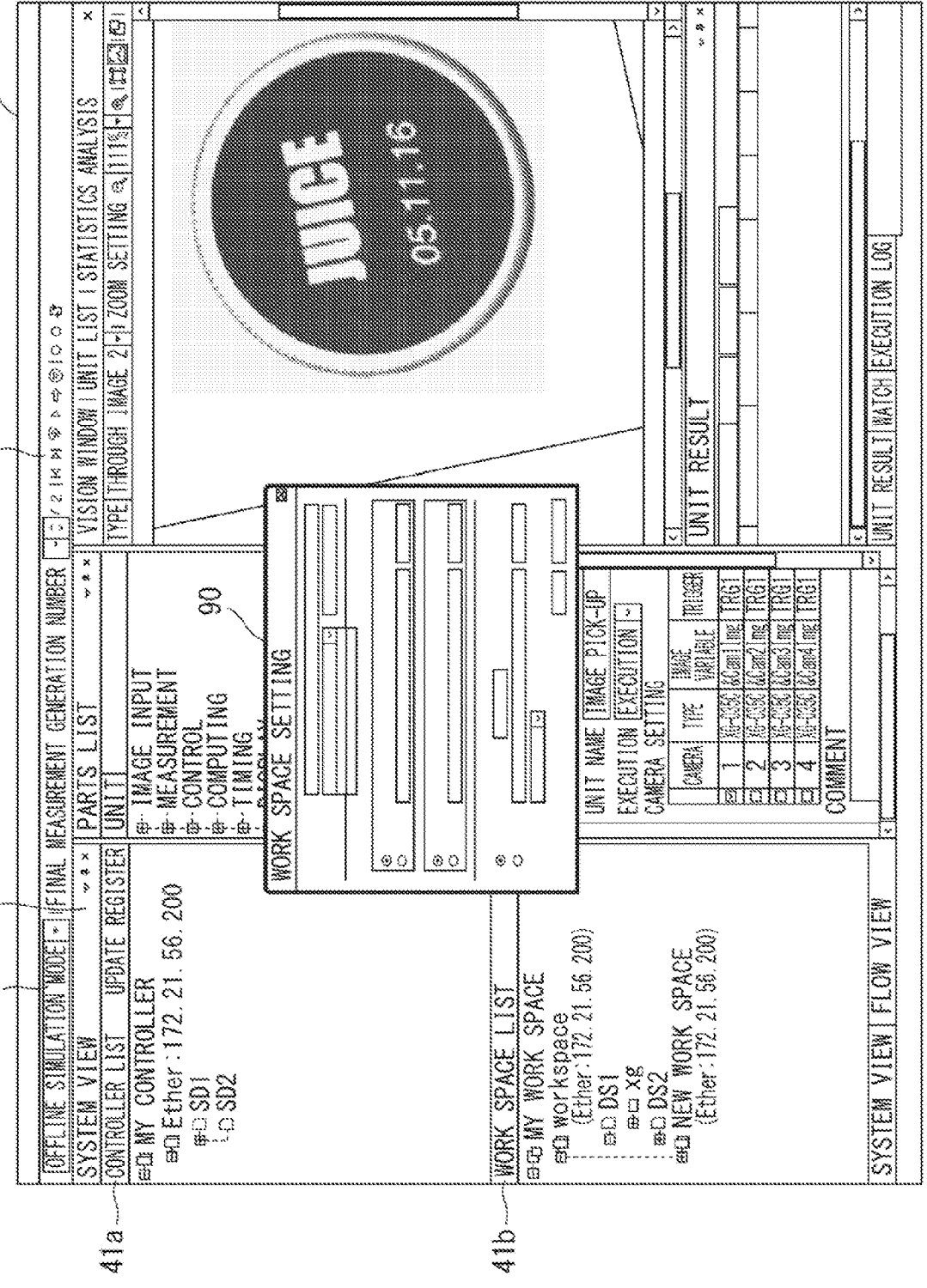
FIG. 7A is a view showing an example of the operation of the PC 2 in the test support system 100 of FIG. 2, showing the editor screen 40 at the time of offline simulation.
Figure 7B:
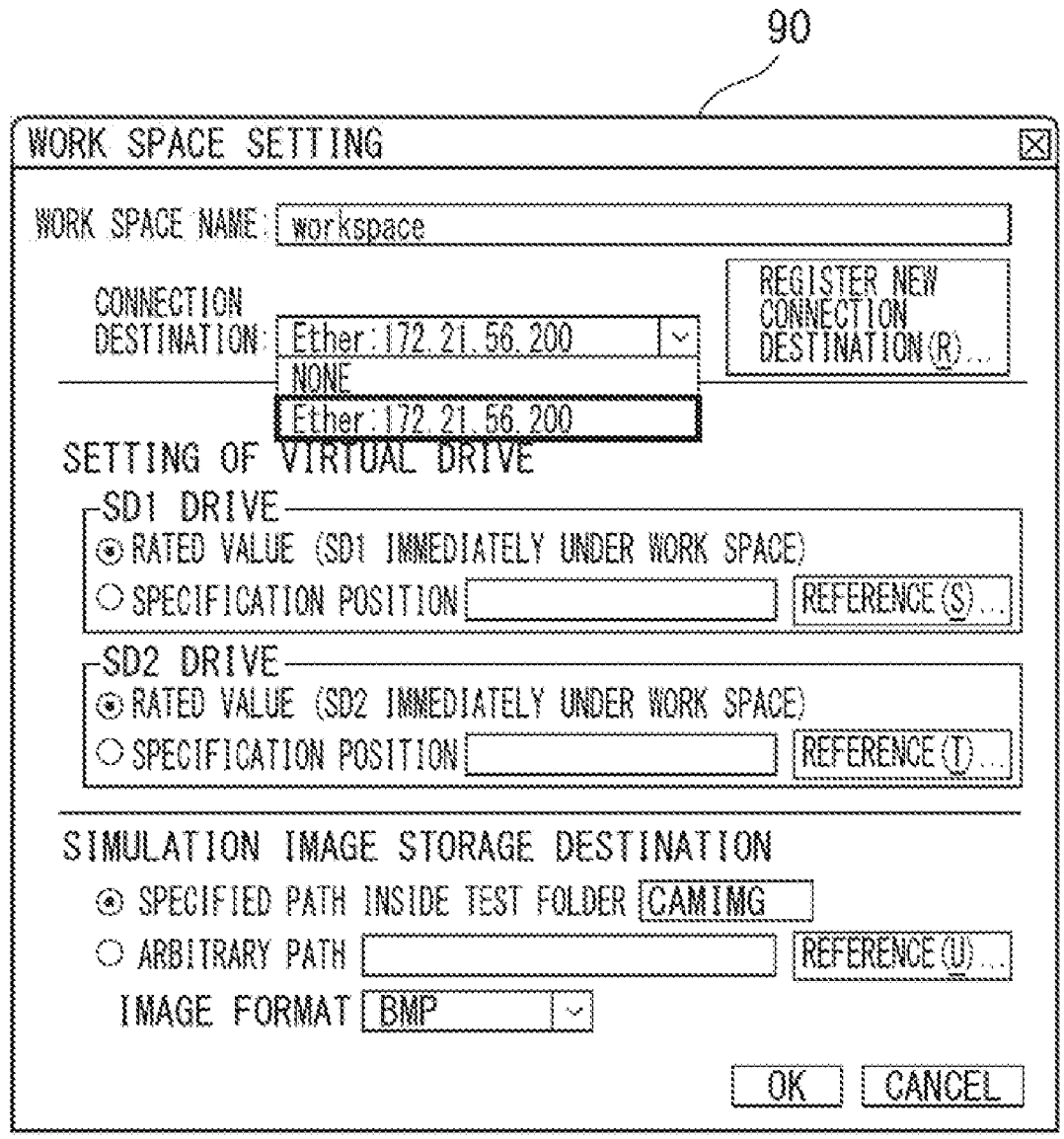
FIG. 7B is a view showing a part of FIG. 7A, showing an example of a work space setting screen 90.

FIG. 7A is a view showing an example of the operation of the PC 2 in the test support system 100 of FIG. 2, and shows the editor screen 40 at the time of offline simulation. This editor screen 40 is an edition screen at the time of offline simulation when image processing is simulated using a camera image previously held as a registration image.

On this editor screen 40, a simulation mode select field 91 and a simulation execution button 92 are arranged, and a work space setting screen 90 selected on the work space list screen 41b is displayed.

The simulation mode select field 91 is an input field for selecting a simulation mode, and capable of selecting either an online simulation mode or an offline simulation mode.

The online simulation is performed by acquiring a camera image from the camera 12 through the image processing controller 11 at the time of executing a control program and then simulating image processing by use of the acquired camera image. A control program as an object for such simulation is a work space (test setting data) selected as an object to be edited on the work space list screen 41a.

The simulation execution button 92 is an icon for operation for executing simulation of image processing. Operating this simulation execution button 92 can execute the test setting data (control program) selected on the work space list screen 41b.

It is assumed here that a control program is executed in just an amount equivalent to one measurement cycle by operation of the simulation execution button 92. Specifically, with a flow sequence, which is started with a start symbol and completed with an end symbol, taken as a measurement cycle, such a flow sequence in amount equivalent to one measurement cycle is executed just once, and simulation is automatically stopped after the execution. Simulation results (a measurement value and a determination value) obtained by such simulation of image processing are, for example, displayed inside the result view window 45.

The setting screen 90 is an input screen for editing a property of a work space (test setting data) selected on the work space list screen 41b. On this setting screen 90, an input field for a work space name, a select field for a connection destination, a setting field for a virtual drive, an input field for a storage destination for a simulation image, and the like are set. The input field for a storage destination for the simulation image is an input field for specifying a registration image for use in offline simulation or changing already specified registration image.

<Setting Screen of Image Pick-Up Unit File>

Figure 8:
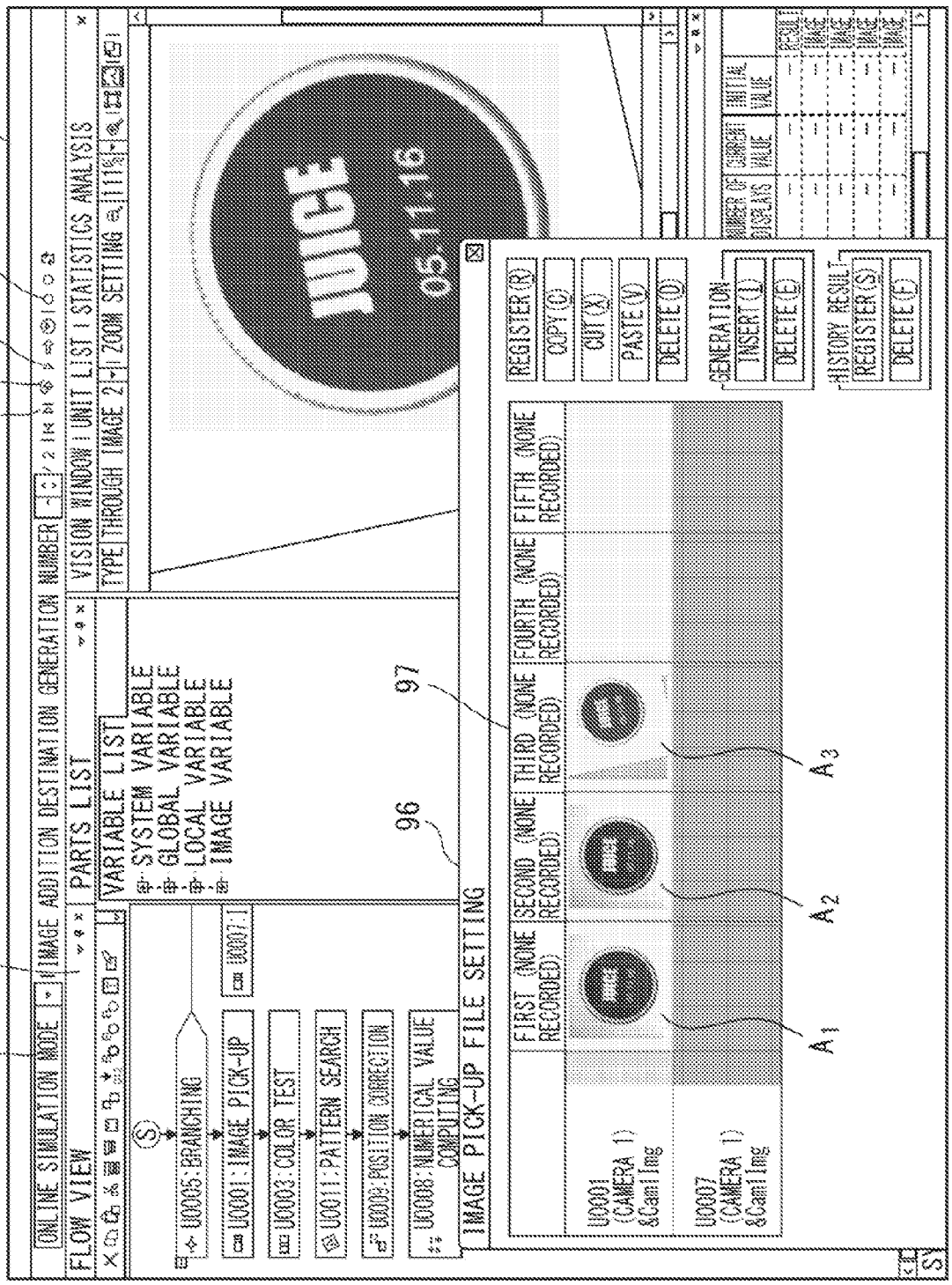
FIG. 8 is a view showing an example of the operation of the PC 2 in the test support system 100 of FIG. 2, showing the editor screen 40 at the time of online simulation.

FIG. 8 is a view showing an example of the operation of the PC 2 in the test support system 100 of FIG. 2, and shows the editor screen 40 at the time of online simulation. This editor screen 40 is an edition screen at the time of online simulation, and the simulation mode select field 91 for the simulation mode, simulation execution buttons 92 to 94, and a record button 95 are arranged, and an image pick-up file setting screen 96 is displayed.

The simulation execution button 93 is an icon for operation for executing a simulation of image processing, and operating this simulation execution button 93 can execute a flow sequence from the start symbol to the end symbol in just an amount equivalent to one measurement cycle.

The simulation execution button 94 is an icon for operation for successively executing the simulation of image processing, and operating this simulation execution button 94 can repeatedly execute a control program.

The record button 95 is an icon for operation for holding a camera image, acquired from the camera 12 at the time of online simulation, as an image pick-up file. Operating this record button 95 can change the mode to a record mode, and operating the simulation execution buttons 92 to 94 during the record mode can hold an image pick-up file of a camera image acquired at the time of executing a control program as a image pick-up file.

A camera image is acquired through use of a remote capture function of an editor. This remote capture function is a function of operating the image processing controller 11 by remote control, to acquire a camera image from the camera 12 through the image processing controller 11.

Specifically an image pick-up request (command) is transferred from the PC 2 to the image processing controller 11, along with a parameter such as an image pick-up condition. The image processing controller 11 having received the image pick-up request stops its operation and comes into a remote capture mode. In this remote capture mode, an operation by the operational unit 13b is restricted, and an operation of transferring a camera image acquired based upon the image pick-up request from the PC 2 is performed.

The image pick-up file setting screen 96 is a window screen for editing a property of an image pick-up file, and displays a camera image, obtained in each measurement cycle by the online simulation, in association with an image pick-up unit.

In this example, camera images $A_1$ to $A_3$ with respect to respective measurement cycles, which were captured into an image pick-up file by an image pick-up unit where the "camera 1" had been selected as an object for acquiring a camera image, are displayed in a display field 97 in time series. The camera image $A_1$ is a camera image acquired in a first measurement, the camera image $A_2$ is a camera image acquired in a second measurement, and the camera image $A_3$ is a camera image acquired in a third measurement. These camera images $A_1$ to $A_3$ are acquired at the timing of executing the image pick-up unit.

The camera images held as the image pick-up files can be used as registration images for offline simulation.

<Functional Configuration of Editor>

Figure 9:
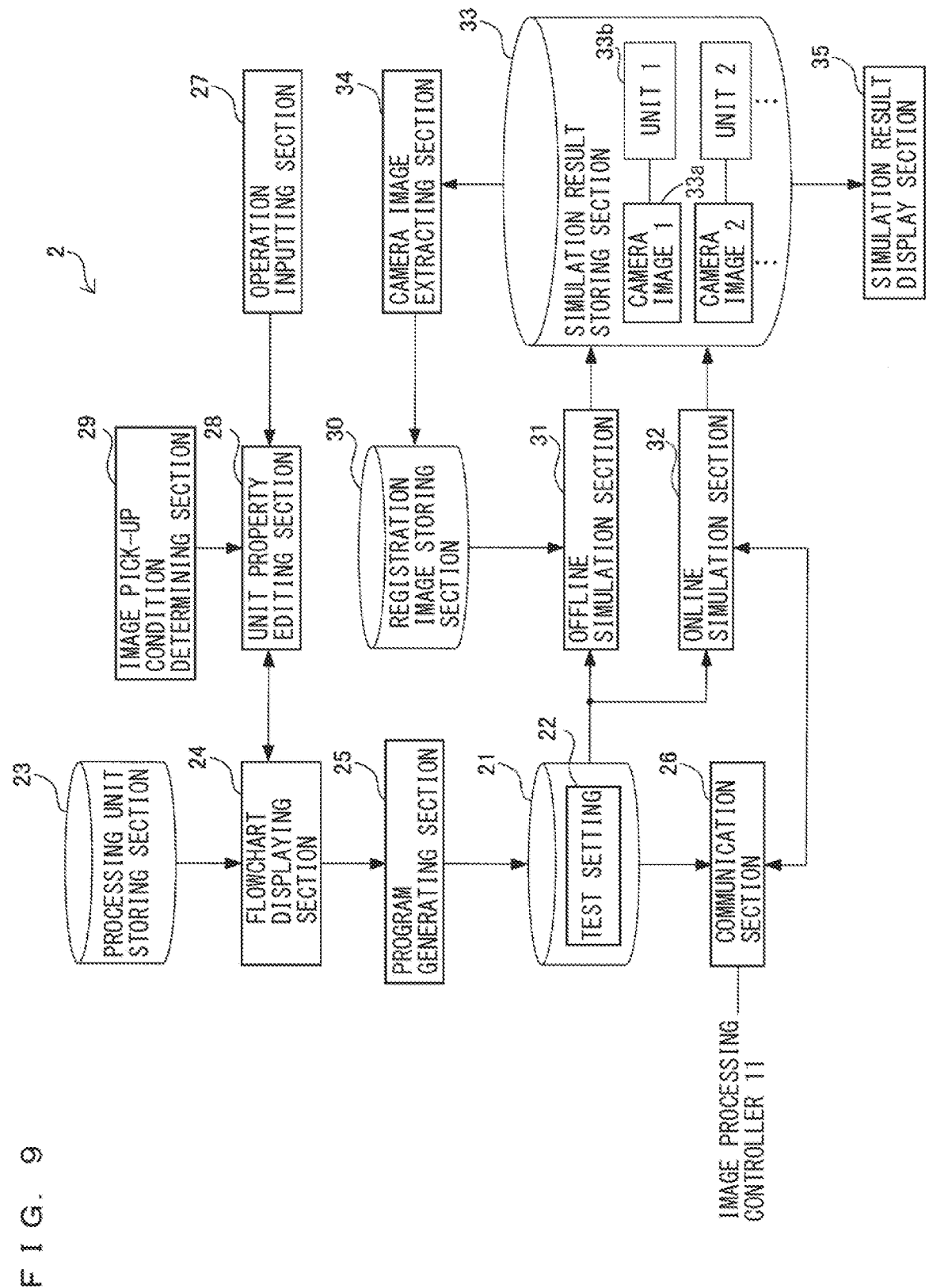
FIG. 9 is a block diagram showing a configurational example of the PC 2 in the test support system 100 of FIG. 2, showing an example of a functional configuration of an editor.

FIG. 9 is a block diagram showing a configurational example of the PC 2 in the test support system 100 of FIG. 2, and shows an example of a functional configuration of an editor that creates a control program for the image processing controller 11. This PC 2 includes the memory 21, a processing unit storing section 23, a flowchart display section 24, a program generating section 25, a communication section 26, an operation inputting section 27, a unit property editing section 28, an image pick-up condition determining section 29, a registration image storing section 30, an offline simulation section 31, an online simulation section 32, a simulation result storing section 33, a camera image extracting section 34, and a simulation result display section 35.

The processing unit storing section 23 holds processing units such as an image pick-up unit and a measurement unit. The image pick-up unit is a processing unit that shows processing for acquiring a camera image from the camera 12 based upon an image pick-up trigger signal. The measurement unit is a processing unit that shows processing for extracting a measurement result from a camera image acquired by the image pick-up unit.

The flowchart display section 24 performs an operation of displaying the flowchart 47, generated by arranging a processing unit on the execution flow that is started with a start symbol and completed with an end symbol, on the flow view window 46 of the editor screen 40.

The program generating section 25 performs an operation of converting the flowchart 47 created by the user on the flow view window 46 into an execution form, to generate a control program for the image processing controller 11. Specifically, a control program is generated for arranging an image pick-up unit or a measurement unit on the execution flow and acquiring a camera image from the camera 12 based upon an input signal from the image pick-up trigger input terminal, to extract a measurement result from the acquired camera image.

The memory 21 holds the control program generated by the program generating section 25, as the test setting data 22. The communication section 26 performs an operation of transferring the test setting data 22 inside the memory 21 to the image processing controller 11.

The unit property editing section 28 performs an operation of editing a property of a processing unit selected on the flowchart 47. Specifically, an operation is performed to display a processing unit, selected by the user as an object to be edited, on the property edition screen and specify a parameter of the processing unit based upon a user operation or change an already specified parameter.

The image pick-up condition determining section 29 is an operation of determining a camera as an object to acquire a camera image from a plurality of cameras 12, as a parameter of an image pick-up unit selected on the flowchart 47.

In a case where a branching unit is arranged on the flowchart 47 and further, an image pick-up unit is arranged on each of a plurality of branch flows branched by the branching unit, an object to capture a camera image can be selected with respect to each of these image pick-up units.

The registration image storing section 30 holds a registration image for offline simulation. The offline simulation section 31 is a simulation part for executing a control program held as the test setting data 22 in the memory 21, and performs an operation of extracting a measurement result from a camera image previously held as a registration image in the registration image storing section 30.

The online simulation section 32 is a simulation part for executing a control program held as the test setting data 22 in the memory 21, and performs an operation of acquiring a camera image at the time of executing a control program, to execute a measurement result. Specifically, at the time of executing a control program, an image pick-up request is transmitted to the image processing controller 11 through the communication section 26 at the timing of executing the image pick-up unit, and a camera image is acquired from the camera 12 through this image processing controller 11. Then, an operation of extracting a measurement result from the acquired camera image is performed.

The simulation result storing section 33 is a camera image storing part for holding a camera image 33a acquired by the online simulation section 32 along with simulation results (a measurement result and a determination value) obtained by executing a control program.

This simulation result storing section 33 holds a series of camera images 33a acquired by the online simulation section 32 when a control program was repeatedly executed. Each of the camera images 33a is held in association with an image pick-up unit. For example, identification information 33b of the processing unit is held in association with the camera image 33a.

The simulation result display section 35 performs an operation of displaying a simulation result on the editor screen 40. For example, as for a processing unit selected on the flowchart 47 inside the flow view window 46, a simulation result is displayed inside the result view window 45.

The camera image extracting section 34 performs an operation of extracting a camera image to be held as a registration image from the series of camera images 33a held in the simulation result storing section 33. With such a configuration, since the series of camera images 33a obtained at the time of online simulation are used as registration images for offline simulation, a parameter such as an image pick-up condition or a measurement condition can set with high accuracy. Namely, a parameter is adjusted with reference to a measurement value or a determination value obtained by online simulation. Subsequently, such an operation is employed that offline simulation is executed using a camera image on an image pick-up file obtained at the time of online simulation, so as to decide a parameter with high accuracy.

In this camera image extracting section 34, in a case where a control program with a plurality of image pick-up units arranged on the flowchart 47 is executed by the offline simulation section 31, with respect to each image pick-up unit on the flowchart 47, an operation is performed to automatically extract a camera image to be held as a registration image from the camera images 33a held in the simulation result storing section 33. With such a configuration, since the camera image 33a obtained at the time of online simulation is automatically extracted as a registration image for offline simulation, the operability at the time of specifying a registration image for offline simulation can be improved. Namely, the labor of specifying a camera image with respect to each image pick-up unit can be saved.

According to the present embodiment, since image processing can be simulated on the PC 2, operational checking of a created control program can be performed without transferring the program to the image processing controller 11. It is therefore possible to improve the operability in operational checking of the created operational program. Further, since a camera image can be acquired from the camera 12 through the image processing controller 11 at the time of executing a control program so as to simulate image processing, it is possible, through use of such simulation result, to set a parameter such as an image pick-up condition or a measurement condition with high accuracy.

What is claimed is:

1. A program creating or editing apparatus present in a non-transitory storage medium, which creates a control program for an image processing controller used in an image processing apparatus including
a camera which photographs an object to be tested, to generate a camera image, and
the image processing controller which acquires the camera image from the camera, extracts a measurement result from the camera image, and determines a quality of the object to be tested based upon this measurement result, to output a determination signal,
the program creating or editing apparatus comprising:
a program generating part for acquiring a camera image from the camera based upon an image pick-up trigger signal, to extract a measurement result from the acquired camera image as a control program for the image processing controller;
a simulation part for executing the control program; and
a transfer part for transferring the control program to the image processing controller,
wherein the simulation part includes
an offline simulation part for extracting a measurement result from a camera image previously held as a registration image, and
an online simulation part for acquiring a camera image from the camera through the image processing controller when executing the control program, to extract the measurement result from the acquired camera image.

2. The program creating or editing apparatus for an image processing controller according to claim 1, comprising:
a camera image storing part for holding a series of camera images acquired by the online simulation part when a control program is repeatedly executed; and
a camera image extracting part for extracting a camera image to be held as the registration image from the series of camera images.

3. The program creating or editing apparatus for an image processing controller according to claim 1, comprising:
a processing unit storing part for holding an image pick-up unit that acquires a camera image from the camera based upon an image pick-up trigger signal, and two or more measurement units that extract a measurement result from the camera image acquired by the image pick-up unit, as processing units showing processing in which a parameter is changeable;
a flow chart displaying part for displaying a flowchart generated by arranging the processing units on an execution flow that is started with a start symbol and completed with an end symbol; and
an image pick-up condition deciding part for deciding a camera as an object to acquire a camera image from a plurality of cameras, as the parameter of the image pick-up unit selected on the flowchart,
wherein
the program generating part generates the control program based upon the flowchart, and
a plurality of the image pick-up units can be arranged on the flowchart, and a camera as an object to acquire a camera image can be selected with respect to each of these image pick-up units.

4. The program creating or editing apparatus for an image processing controller according to claim 3, comprising
a camera image storing part for holding a camera image, acquired by the online simulation part, in association with the image pick-up unit when a control program is repeatedly executed,
wherein, in a case where a control program with a plurality of the image pick-up units arranged on the flowchart is executed by the offline simulation part, a camera image to be held as the registration image is automatically extracted from camera images held in the camera image storing part, with respect to each image pick-up unit on the flowchart.

* * * * *